(12) United States Patent
Yoda et al.

(10) Patent No.: US 11,561,118 B2
(45) Date of Patent: *Jan. 24, 2023

(54) STATE SPECIFYING SYSTEM, STATE SPECIFYING APPARATUS, STATE SPECIFYING METHOD, AND NON-TRANSITORY COMPUTER READABLE MEDIUM

(71) Applicant: NEC Corporation, Tokyo (JP)

(72) Inventors: Yukihide Yoda, Tokyo (JP); Yoshiaki Aono, Tokyo (JP); Koji Asahi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 17/270,325

(22) PCT Filed: Apr. 25, 2019

(86) PCT No.: PCT/JP2019/017687

§ 371 (c)(1),
(2) Date: Feb. 22, 2021

(87) PCT Pub. No.: WO2020/044660

PCT Pub. Date: Mar. 5, 2020

(65) Prior Publication Data

US 2021/0247214 A1    Aug. 12, 2021

(30) Foreign Application Priority Data

Aug. 30, 2018    (JP) .............................. JP2018-162041

(51) Int. Cl.
*G01D 5/353*    (2006.01)

(52) U.S. Cl.
CPC .................................... *G01D 5/353* (2013.01)

(58) Field of Classification Search
CPC ...................................................... G01D 5/353
See application file for complete search history.

(56) References Cited

U.S. PATENT DOCUMENTS

2021/0247215 A1* 8/2021 Yoda .................... G01N 21/952

FOREIGN PATENT DOCUMENTS

| CN | 103925984 A | 7/2014 |
|---|---|---|
| CN | 104121889 A | 10/2014 |
| CN | 104121982 A | 10/2014 |
| CN | 104483007 A | 4/2015 |

(Continued)

OTHER PUBLICATIONS

Extended European Search Report for EP Application No. EP19853427.3 dated Sep. 21, 2021.

(Continued)

*Primary Examiner* — Georgia Y Epps
*Assistant Examiner* — Don J Williams

(57) ABSTRACT

A state specifying system according to the present disclosure includes a cable (20) disposed in a utility pole (10), the cable (20) containing a communication optical fiber, a receiving unit (331) configured to receive an optical signal from at least one optical fiber contained in the cable (20), and a specifying unit (332) configured to specify a state of the utility pole (10) or an environmental state around the utility pole (10) corresponding to a pattern of the optical signal received by the receiving unit (331).

9 Claims, 14 Drawing Sheets

(56) References Cited

FOREIGN PATENT DOCUMENTS

| CN | 105629257 A | 6/2016 |
| CN | 106091945 A | 11/2016 |
| CN | 107113026 A | 8/2017 |
| CN | 207010081 U | 2/2018 |
| JP | 2002-152937 A | 5/2002 |
| JP | 2006-338577 A | 12/2006 |
| JP | 2008-67467 A | 3/2008 |
| JP | 2015-53832 A | 3/2015 |

OTHER PUBLICATIONS

Udd E et al., "Fiber grating systems used to measure strain in cylindrical structures", Optical Engineering. Soc. of Photo-Optical Instrumentation Engineers, Bellingham, vol. 36, No. 7, Jul. 1, 1997.
International Search Report for PCT Application No. PCT/JP2019/017687, dated Jul. 30, 2019.
Chinese Office Action for CN Application No. 201980055565.0 dated Apr. 2, 2022 with English Translation.

* cited by examiner

| UTILITY POLE NUMBER | DISTANCE FROM FIBER SENSING UNIT |
|---|---|
| A | xx km |
| B | yy km |
| C | zz km |

Fig. 2

| PATTERN OF BACKSCATTERED LIGHT | STATE THAT CAN BE SPECIFIED BASED ON PATTERN | CAUSE OF PATTERN |
|---|---|---|
| A | DETERIORATION LEVEL OF UTILITY POLE: NORMAL, DETERIORATION LEVEL 1, DETERIORATION LEVEL 2, ... | VIBRATIONS OF UTILITY POLE |
| B | TEMPERATURE AROUND UTILITY POLE | CHANGE IN TEMPERATURE OF OPTICAL FIBER |
| C | SOUND AROUND UTILITY POLE: SOUND OF BIRD AND ANIMAL, SOUND OF ACCIDENT, AND THE LIKE | VIBRATIONS OF OPTICAL FIBER LOCATED RIGHT ABOVE UTILITY POLE |
| D | VIBRATIONS IN GROUND RIGHT BELOW UTILITY POLE: PASSAGE OF VEHICLE/TRAIN AND THE LIKE, AND EARTHQUAKE AND THE LIKE | VIBRATIONS OF UTILITY POLE |
| E | ARTIFICIAL IMPACT ON UTILITY POLE: CONSTRUCTION IN UTILITY POLE, PASTING OF POSTER ON UTILITY POLE, AND THE LIKE | VIBRATIONS OF UTILITY POLE |

| APPLICATION NAME | BRIEF DESCRIPTION | DATA TO BE ANALYZED |
|---|---|---|
| DETECTION OF UNAUTHORIZED CONSTRUCTION DETECTION OF AUTHORIZED CONSTRUCTION | OCCURRENCE OF CONSTRUCTION IN UTILITY POLE IS DETECTED | VIBRATIONS |
| DETECTION OF DAMAGE BY BIRD AND ANIMAL | FORMATION OF NEST IN UTILITY POLE IS DETECTED | SOUND |
| DETECTION OF ABNORMALITY OF FIBER | OCCURRENCE OF POLARIZATION FLUCTUATION OF FIBER IS DETECTED | VIBRATIONS |
| DETECTION OF ABNORMALITY OF POWER LINE | RISE IN TEMPERATURE OF ELECTRIC WIRE AND CRACKING IN CABLE ARE DETECTED | TEMPERATURE |
| DETECTION OF ACCIDENT | ACCIDENT THAT HAS OCCURRED NEAR UTILITY POLE IS DETECTED | SOUND, VIBRATIONS |
| METEOROLOGICAL DETECTION | TEMPERATURE OF FIBER AND AIR VOLUME ARE DETECTED | TEMPERATURE |
| DISASTER PREVENTION | DISASTER NEAR UTILITY POLE IS DETECTED | VIBRATIONS |
| CRIME PREVENTION | CRIME NEAR UTILITY POLE IS DETECTED | SOUND |

| PATTERN OF BACKSCATTERED LIGHT | STATE OF UTILITY POLE |
|---|---|
| PATTERN X | NORMAL |
| PATTERN Y | DETERIORATION LEVEL 1 |
| PATTERN Z | DETERIORATION LEVEL 2 |

STATE SPECIFYING SYSTEM, STATE SPECIFYING APPARATUS, STATE SPECIFYING METHOD, AND NON-TRANSITORY COMPUTER READABLE MEDIUM

This application is a National Stage Entry of PCT/JP2019/017687 filed on Apr. 25, 2019, which claims priority from Japanese Patent Application 2018-162041 filed on Aug. 30, 2018, the contents of all of which are incorporated herein by reference, in their entirety.

TECHNICAL FIELD

The present disclosure relates to a stated specifying system, a state specifying apparatus, a state specifying method, and a non-transitory computer readable medium.

BACKGROUND ART

Conventionally, abnormalities of utility poles are often detected manually. For example, a worker determines an abnormality only by a visual observation, or taps on a utility pole and determines an abnormality based on reverberating sound or the like. However, when an abnormality of a utility pole is manually detected, it takes large amounts of time and cost, and thus in some cases, detecting an abnormality and coping therewith are delayed.

Therefore, recently, a system for monitoring a utility pole for detecting an abnormality thereof by using an optical fiber has been proposed (e.g., Patent Literatures 1 and 2).

In a technique disclosed in Patent Literature 1, an optical fiber is linearly or spirally disposed in the vertical direction of a utility pole. When a utility pole is broken by a collision of an automobile with the utility pole, the optical fiber is severely bent, so that a loss occurs in an optical signal propagating through the inside of the optical fiber. In this way, it is detected that one of a plurality of utility poles has been broken by detecting the amount of a loss caused by the above-described loss through OTDR (Optical Time-Domain Reflectometry) measurement.

Further, in a technique disclosed in Patent Literature 2, a nesting detection core line, which is composed of an optical fiber for detecting nesting in a utility pole, is disposed. When the nesting detection core line is warped due to nesting in the utility pole, the nesting detection core line is distorted, e.g., is bent or stretched, so that the strength of an optical signal propagating through the inside of the nesting detection core line is attenuated. As a result, it is detected that a nest has been made by detecting the amount of a loss caused by this attenuation through OTDR measurement.

CITATION LIST

Patent Literature

Patent Literature 1: Japanese Unexamined Patent Application Publication No. 2008-067467
Patent Literature 2: Japanese Unexamined Patent Application Publication No. 2015-053832

SUMMARY OF INVENTION

Technical Problem

Incidentally, in the techniques disclosed in Patent Literatures 1 and 2, an abnormality of a utility pole is detected by monitoring the amount of a loss in an optical signal that is caused when a strong stress is exerted on an optical fiber.

Therefore, there is a problem that although it is possible to detect an extreme state such as nesting in the utility pole or a breakage thereof, it is very difficult to detect a state that hardly affects the stress on the optical fiber.

Meanwhile, in recent years, as the technology of IoT (Internet of Things) and the like has advanced, it has been increasingly required to detect various phenomena around utility poles such as environmental situations and temperatures around utility poles. However, it is likely that an environmental change around a utility pole may not cause any significant change in the stress exerted on an optical fiber disposed therein. Further, it is also necessary to individually specify each of various different environmental changes around a utility pole.

Therefore, an object of the present disclosure is to solve the above-described problem and to provide a state specifying system, a state specifying apparatus, a state specifying method, and a non-transitory computer readable medium capable of accurately specifying a state of a utility pole or an environmental state therearound.

Solution to Problem

A state specifying system according to one aspect includes:
a cable disposed in a utility pole, the cable containing a communication optical fiber;
a receiving unit configured to receive an optical signal from at least one communication optical fiber contained in the cable; and
a specifying unit configured to specify a state of the utility pole or an environmental state around the utility pole corresponding to a pattern of the optical signal received by the receiving unit.

A state specifying apparatus according to another aspect includes:
a receiving unit configured to receive an optical signal from at least one communication optical fiber contained in a cable disposed in a utility pole; and
a specifying unit configured to specify a state of the utility pole or an environmental state around the utility pole corresponding to a pattern of the optical signal received by the receiving unit.

A state specifying method according to another aspect is a state specifying method performed by a state specifying apparatus, including:
receiving an optical signal from at least one communication optical fiber contained in a cable disposed in a utility pole; and
specifying a state of the utility pole or an environmental state around the utility pole corresponding to a pattern of the received optical signal.

A non-transitory computer readable medium according to another aspect is a non-transitory computer readable medium storing a program for causing a computer to perform:
a process of receiving an optical signal from at least one communication optical fiber contained in a cable disposed in a utility pole; and
a process of specifying a state of the utility pole or an environmental state around the utility pole corresponding to a pattern of the received optical signal.

Advantageous Effects of Invention

According to the above-described aspect, it is possible to achieve an advantageous effect that a state of a utility pole or an environmental state therearound can be accurately specified.

BRIEF DESCRIPTION OF DRAWINGS

FIG. 2 shows an example of location information according to an example embodiment;

FIG. 3 shows examples of states of a utility pole and environmental states around the utility pole that can be specified by a specifying unit according to an example embodiment;

FIG. 4 shows examples of applications that can be implemented based on the state specified by a specifying unit according to an example embodiment;

DESCRIPTION OF EMBODIMENTS

Example embodiments according to the present disclosure will be described hereinafter with reference to the drawings.

Example Embodiment

Configuration of Example Embodiment

Firstly, a configuration of a state specifying system according to this example embodiment will be described with reference to FIG. 1. Note that, in FIG. 1, only three utility poles 10 are shown for simplifying the explanation. Further, the three utility poles 10 are indicated by utility pole numbers A, B and C, respectively.

Figure 1:
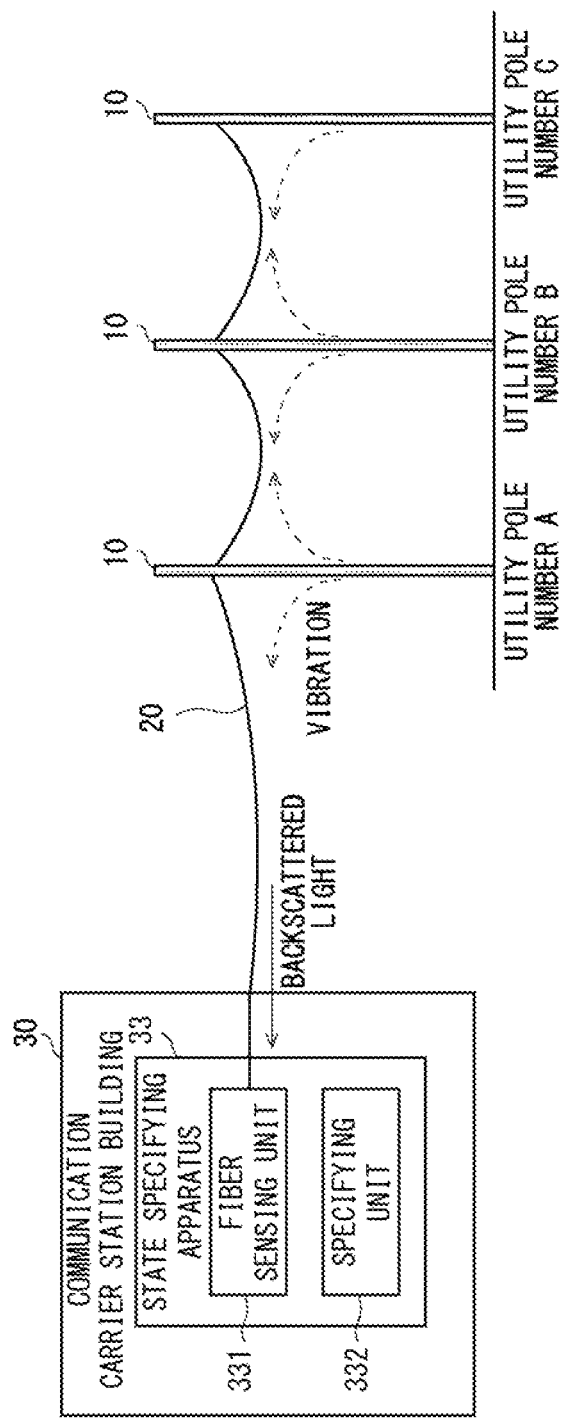
FIG. 1 shows an example of a configuration of a state specifying system according to an example embodiment.

As shown in FIG. 1, the state specifying system according to this example embodiment specifies a state of a utility pole 10 or an environmental state around the utility pole 10, and includes an optical fiber cable 20 and a state specifying apparatus 33.

The optical fiber cable 20 is strung (e.g., stretched) through the utility poles 10. When the optical fiber cable 20 is strung through the utility poles 10, it is strung (e.g., stretched) substantially perpendicular to the longitudinal direction of the utility poles 10. The optical fiber cable 20 is a cable containing at least one communication optical fiber. One end of the optical fiber cable 20 is routed to the inside of a communication carrier station building 30, and the other end thereof is terminated at the utility pole 10 having the utility pole number C.

The state specifying system according to this example embodiment specifies the state of the utility pole 10 or the environmental state around the utility pole 10 by using an optical fiber sensing technique in which the optical fiber is used as a sensor.

Specifically, pulsed light is made to enter the communication optical fiber contained in the optical fiber cable 20 inside the communication carrier station building 30. As a result, as the pulsed light is transmitted through the communication optical fiber toward the utility poles 10, backscattered light is generated each time the pulsed light travels a certain transmission distance. The backscattered light returns to the inside of the communication carrier station building 30 through the same communication optical fiber.

Note that the utility poles 10 vibrate due to disturbances from the surrounding environment or naturally vibrate, and the vibrations of the utility poles 10 are transmitted to the communication optical fiber. Further, the vibration pattern of the utility pole 10 changes according to the state of the utility pole 10. For example, the vibration pattern of a normal utility pole 10 is different from that of a deteriorated utility pole 10. Therefore, the backscattered light returning to the inside of the communication carrier station building 30 contains a pattern that changes according to the state of the utility pole 10.

Further, the backscattered light returning to the inside of the communication carrier station building 30 also contains a pattern that changes according to the environmental state around the utility pole 10. For example, the backscattered light contains a pattern that changes according to the vibrations of the communication optical fiber disposed in the utility pole 10 and a pattern that changes according to a change in the temperature of the communication optical fiber.

In the example shown in FIG. 1, since three utility poles 10 are provided, the backscattered light returning to the inside of the communication carrier station building 30 contains, for each of the three utility poles 10, a pattern that changes according to the state of the utility poles 10 or a pattern that changes according to the environmental state around the utility poles 10.

The state specifying system according to this example embodiment specifies the state of the utility pole 10 or the environmental state around the utility pole 10 by utilizing the fact that the backscattered light returning to the inside of the communication carrier station building 30 includes a pattern that changes according to the state of the utility pole 10 or a pattern that changes according to the environmental state around the utility pole 10.

Note that the above-described state specifying apparatus 33 is provided inside the communication carrier station building 30. The state specifying apparatus 33 is equipment that is newly installed in order to implement this example embodiment.

The state specifying apparatus 33 is an apparatus having a function of specifying the state of the utility pole 10 or the environmental state around the utility pole 10 in addition to the functions as the optical fiber sensing apparatus. Specifically, the state specifying apparatus 33 includes a fiber sensing unit 331 and a specifying unit 332. The fiber sensing unit 331 is an example of the receiving unit.

The fiber sensing unit 331 makes pulsed light enter at least one communication optical fiber contained in the optical fiber cable 20. This pulsed light is transmitted toward the utility poles 10. Further, the fiber sensing unit 331 receives backscattered light of the pulsed light from the same communication optical fiber to which the pulsed light has entered. This backscattered light is received in the direction from the utility poles 10.

Note that, as described above, the backscattered light received by the fiber sensing unit 331 contains a pattern that changes according to the state of the utility pole 10 or a pattern that changes according to the environmental state around the utility pole 10.

Therefore, the specifying unit 332 specifies the state of the utility pole 10 or the environmental state around the utility pole 10 corresponding to the pattern of the backscattered light received by the fiber sensing unit 331.

Note that, in the example shown in FIG. 1, since the three utility poles 10 are provided, the fiber sensing unit 331 receives backscattered light having a pattern that changes according to the state of each of the three utility poles 10 or the environmental state of each of them in a chronological manner.

Therefore, when the fiber sensing unit 331 receives backscattered light having such a pattern, it first identifies a utility pole 10 in which that backscattered light was generated. Then, the specifying unit 332 specifies the state of the utility pole 10 identified by the fiber sensing unit 331 or the environmental state around that utility pole 10.

Therefore, a method for identifying, when the fiber sensing unit 331 receives backscattered light having a pattern that changes according to a state of a utility pole 10 or an environmental state therearound, the utility pole 10 in which that backscattered light was generated will be described hereinafter.

In this example embodiment, the fiber sensing unit 331 holds location information indicating the location of each utility pole 10 in advance. FIG. 2 shows an example of location information. Note that, in FIG. 2, a relation zz>yy>xx holds. The specifying unit 332 calculates a generation point where backscattered light having a pattern that changes according to the state of the utility pole 10 or the environment state therearound was generated based on a time difference between a time when the fiber sensing unit 331 made pulsed light enter the communication optical fiber and a time when it received that backscattered light from the same communication optical fiber. Note that the fiber sensing unit 331 calculates the generation point in such a manner that the smaller the above-described time difference is, the closer the generation point is to the fiber sensing unit 331. Then, the fiber sensing unit 331 identifies the utility pole 10 where the backscattered light was generated by referring to the location information shown in FIG. 2.

In the example shown in FIG. 1, the fiber sensing unit 331 receives backscattered light of a pattern that changes according to the state of each of the three utility poles 10 or the environmental state of each of them in a chronological manner. Therefore, the fiber sensing unit 331 calculates the generation point of each of these backscattered lights and refers to the location information shown in FIG. 2. As a result, the fiber sensing unit 331 specifies backscattered light of which the generation point coincides with the distance from the fiber sensing unit 331 to the utility pole 10 having the utility pole number A as backscattered light generated in the utility pole 10 having the utility pole number A. Further, the fiber sensing unit 331 specifies backscattered light of which the generation point coincides with the distance from the fiber sensing unit 331 to the utility pole 10 having the utility pole number B as backscattered light generated in the utility pole 10 having the utility pole number B, and specifies backscattered light of which the generation point coincides with the distance from the fiber sensing unit 331 to the utility pole 10 having the utility pole number C as backscattered light generated in the utility pole 10 having the utility pole number C.

Next the state of the utility pole 10 and the environmental state therearound which the specifying unit 332 can specify based on the pattern of the backscattered light received by the fiber sensing unit 331 will be described with reference to FIG. 3.

As shown in FIG. 3, for example, the vibration pattern of a utility pole 10 changes according to the deterioration state (the deterioration level) of the utility pole 10. Further, the vibration pattern of the utility pole 10 is contained in the backscattered light received by the fiber sensing unit 331. Therefore, the specifying unit 332 can specify the deterioration state of the utility pole 10 corresponding to the pattern of the backscattered light.

Further, the temperature of the communication optical fiber changes according to the temperature around the utility pole 10. Further, the pattern that changes according to the change in the temperature of the communication optical fiber is contained in the backscattered light received by the fiber sensing unit 331. Therefore, the specifying unit 332 can specify the temperature around the utility pole 10 corresponding to the pattern of the backscattered light.

Further, the vibration pattern of the communication optical fiber located right above the utility pole 10 changes according to the sound around the utility pole 10. Further, the vibration pattern of the communication optical fiber is contained in the backscattered light received by the fiber sensing unit 331. Therefore, the specifying unit 332 can specify the sound around the utility pole 10 corresponding to the pattern of the backscattered light.

In addition, the specifying unit 332 can also specify vibrations of the ground right below the utility pole 10 corresponding to the pattern contained in the backscattered light, and specify an artificial impact or the like exerted on the utility pole 10 corresponding to the pattern contained in the backscattered light.

Next, applications that can be implemented based on the state of the utility pole 10 and the environmental state therearound specified by the specifying unit 332 will be described hereinafter with reference to FIG. 4.

For example, the below-described Applications (a) to (h) can be implemented based on the state of the utility pole 10 and the environmental state therearound specified by the specifying unit 332. Each of the applications will be described hereinafter.

(a) Detection of Unauthorized Construction/Detection of Authorized Construction
Problem and Effect:

When unauthorized construction is carried out in a utility pole 10, an administrator of the utility pole is notified about that, so that he/she can prevent the equipment from being damaged by the unauthorized construction.

Further, when the construction for the utility pole 10 is authorized one, he/she can recognize the situation of the construction from a remote place.
Outline of Operation:

The onset of construction is detected by detecting a vibration pattern of a utility pole 10 that is caused by the construction in which an accessory apparatus is attached to or removed from the utility pole 10.

(b) Detection of Damage by Bird and Animal
Problem and Effect:

There are cases in which a short circuit occurs in a utility pole 10 because of nesting therein, and an electric wire and accessory equipment are damaged thereby. It is possible to prevent the equipment of the utility pole from being damaged by a bird by detecting that a bird's nest is formed in the utility pole 10.
Outline of Operation:

When a pattern of a chirp of a bird around a utility pole 10 occurs with certain frequency, it is detected that a nest is formed.

(c) Detection of Abnormality of Fiber
Problem and Effect:

Vibrations occur in the communication optical fiber due to the deterioration of equipment for fixing the communication optical fiber or the deterioration of a coating of the fiber core, and due to the propagation of large vibrations generated around the utility pole 10. There is a problem that, due to the vibrations, a sudden polarization fluctuation of an optical signal propagating through the communication optical fiber occurs, and as a result an error of the optical signal occurs. By monitoring the magnitude of the vibrations of the communication optical fiber, it is possible to notify (i.e., report) a possibility of the occurrence of a sudden polarization fluctuation as an alarm, and thereby to improve the quality of the communication service.
Outline of Operation:

When the magnitude of the vibrations of the communication optical fiber on a time-by-time basis exceeds a certain threshold, it is detected as the occurrence of a polarization fluctuation problem.

(d) Detection of Abnormality of Power Line
Problem and Effect:

There is a problem that the disconnection of a power transmission cable and the deterioration of electric transmission occur due to the deterioration of the coating of the power transmission cable fixed to the utility pole 10 or the deterioration of the power transmission cable itself. In an OPGW (optical ground wire), since an electric wire and a communication optical fiber are contained in the same cable, it is possible to detect the abnormal part of the power transmission line by monitoring the communication optical fiber for the abnormality thereof.
Outline of Operation:

A rise in the temperature of the electric wire caused by a rise in the resistance of the cable is detected by detecting a rise in the temperature of the communication optical fiber located adjacent to the electric wire to or beyond a threshold. Further, cracking in the cable is detected by detecting a change in the temperature caused by the contact with the outside air.

(e) Detection of Accident
Problem and Effect:

An accident that has occurred near the utility pole 10 is detected, and the occurrence of the accident and the time of the occurrence are specified. There was a problem that there was no information objectively indicating the situation of an accident when there was neither vehicular equipment nor equipment such as a camera around the place where the accident has occurred. This information will be useful when the police and an insurance company investigate the accident.
Outline of Operation:

A pattern of a sound of a collision of a vehicle with the utility pole 10 and that of a sound of braking are detected.

(F) Meteorological Detection
Problem and Effect:

Atmospheric-temperature information and air-volume measurement have been collected by using electric monitors in the past, but there has been a problem that since the monitors are electric types, they require power supply. Since the communication optical fiber disposed in the utility pole 10 serves as a temperature monitor, it is possible to obtain temperature information over a wide area in a distributed manner. Further, since a wind is transmitted as vibrations of the communication optical fiber, it is also possible to monitor the volume of air by using the communication optical fiber disposed in the utility pole 10.

Therefore, it is possible to acquire data over a wide area which cannot have been acquired in the past and to provide detailed weather information.
Outline of Operation:

The temperature of the communication optical fiber is monitored. Further, the magnitude of vibrations of the communication optical fiber is converted into information about the volume of air.

(g) Disaster Prevention
Problem and Effect:

Disasters such as landslides, land subsidence, degradations of the ground, and earthquakes that occur near a utility pole 10 are all transmitted to the utility pole 10 in the form of vibrations.

In the past, there have been problems that such disasters have not been monitored or have been monitored only on a place-by-place basis such as only in places equipped with vibrometers. Further, such equipment requires power supply.

Since the vibrations of the utility pole 10 can be monitored, it is possible to detect the aforementioned disasters.
Outline of Operation:

Landslides, land subsidence, degradations of the ground are detected based on the pattern of vibrations of the utility pole 10. Further, the arrival range and the seismic center of an earthquake are specified by acquiring the patterns of vibrations of a plurality of utility poles 10.

(h) Crime Prevention
Problem and Effect:

Crimes are prevented and rescues are made in case of emergency by performing monitoring for screaming for help that occurs near the utility pole 10.
Outline of Operation:

Specific words calling for help, such as "Somebody, help me!", and patterns of human screaming are detected.

As will be described later, the above-described Applications (a) to (h) may be stored as programs by using a non-transitory computer readable medium and supplied to a computer, or supplied to a computer by using a temporary computer readable medium.

Next, a method in which the specifying unit 332 specifies the state of the utility pole 10 or the environmental state therearound based on the pattern of the backscattered light received by the fiber sensing unit 331 will be described hereinafter.

The specifying unit 332 holds a correspondence table in which patterns of backscattered light are associated with states of the utility pole 10 or environmental states around the utility pole 10. Therefore, the specifying unit 332 specifies, by using this correspondence table, the state of the utility pole 10 or the environmental state around the utility pole 10 corresponding to the pattern of the backscattered light received by the fiber sensing unit 331.

The correspondence table held by the specifying unit 332 will be described hereinafter with reference to FIG. 5. Note that FIG. 5 is an example of the correspondence table that is used when the deterioration state of a utility pole 10 is specified as the state of the utility pole 10.

Figures 5, 6:
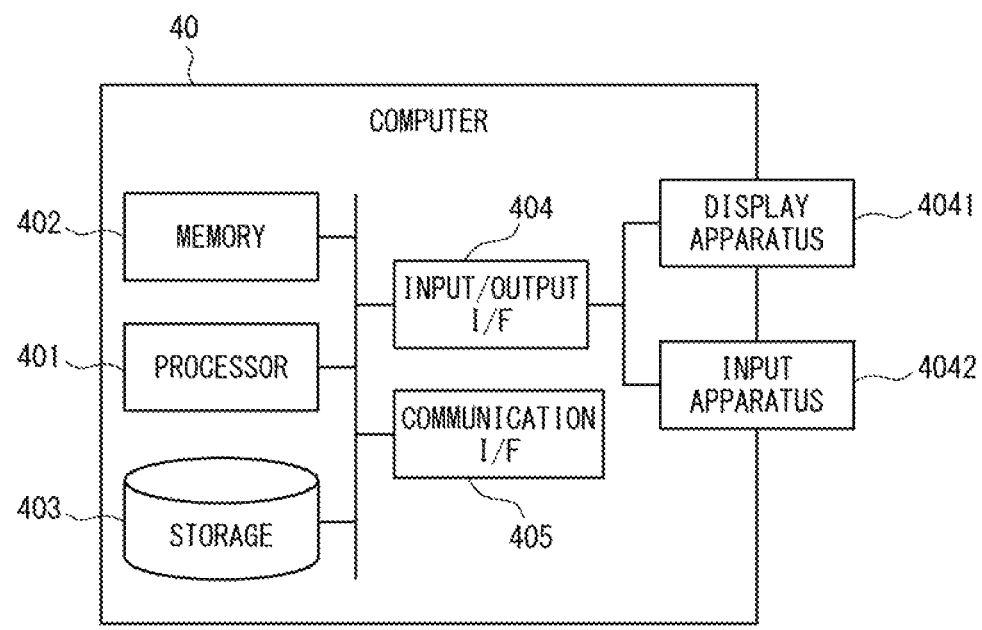
FIG. 5 shows an example of a correspondence table according to an example embodiment.
FIG. 6 is a block diagram showing an example of a hardware configuration of a computer that implements a state specifying apparatus according to an example embodiment.

As shown in FIG. 5, in the correspondence table, patterns of backscattered light are associated with states of the utility pole 10 (deterioration states of the utility pole 10 in this example). Therefore, the specifying unit 332 determines that the utility pole 10 is normal when the pattern of the backscattered light received by the fiber sensing unit 331 is classified as a pattern X, determines that the utility pole 10 is at a deterioration level 1 when the pattern of the backscattered light is classified as a pattern Y, and determines that the utility pole 10 is at a deterioration level 2 when the pattern of the backscattered light is classified as a pattern Z. Note that, in FIG. 5, it is indicated that the higher the numerical value of the deterioration level is, the more the deterioration has advanced.

Next, a hardware configuration of a computer 40 that implements the state specifying apparatus 33 will be described with reference to FIG. 6.

As shown in FIG. 6, the computer 40 includes a processor 401, a memory 402, a storage 403, an input/output interface (an input/output I/F) 404, a communication interface (communication I/F) 405, and the like. The processor 401, the memory 402, the storage 403, the input/output interface 404, and the communication interface 405 are connected to each other through data transmission lines through which they transmit/receive data to/from each other.

The processor 401 is, for example, an arithmetic processing unit such as a CPU (Central Processing Unit) or a GPU (Graphics Processing Unit). The memory 402 is, for example, a memory such as a RAM (random access memory) or a ROM (Read Only Memory). The storage 403 is, for example, a storage device such as an HDD (Hard Disk Drive), an SSD (Solid State Drive), or a memory card. Further, the storage 403 may be a memory such as a RAM or a ROM.

The storage 403 stores programs for implementing the functions of the fiber sensing unit 331 and the specifying unit 332 included in the state specifying apparatus 33. The processor 401 implements the function of each of the fiber sensing unit 331 and the specifying unit 332 by executing the respective programs. Note that when the processor 401 executes these respective programs, it may execute the programs after loading them onto the memory 402 or may execute the programs without loading them onto the memory 402. Further, the memory 402 and the storage 403 also have a function of storing information and data held by the fiber sensing unit 331 and the specifying unit 332.

Further, the above-described program can be stored and provided to a computer (including the computer 40) using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The input/output interface 404 is connected to a display apparatus 4041, an input apparatus 4042, and the like. The display apparatus 4041 is an apparatus, such as an LCD (Liquid Crystal Display) or a CRT (Cathode Ray Tube) display, which displays an image corresponding to drawing data processed by processor 401. The input apparatus 4042 is an apparatus that receives an operation input from an operator, and is, for example, a keyboard, a mouse, and a touch sensor. The display apparatus 4041 and the input apparatus 4042 may be integrated with each other and hence implemented as a touch panel. Note that the computer 40 may also include sensors (not shown) including a distributed acoustic sensor (Distributed Acoustic Sensor) and a distributed vibration sensor (Distributed Vibration Sensor), and have a configuration in which these sensors are connected to the input/output interface 404.

The communication interface 405 transmits/receives data to/from an external apparatus. For example, the communication interface 405 communicates with an external apparatus through a wired communication line or a radio communication channel.

Operation in Example Embodiment

Operation performed by the state specifying system according to this example embodiment will be described hereinafter. Here, a flow of operations performed by the state specifying system according to this example embodiment will be described with reference to FIG. 7.

Figure 7:
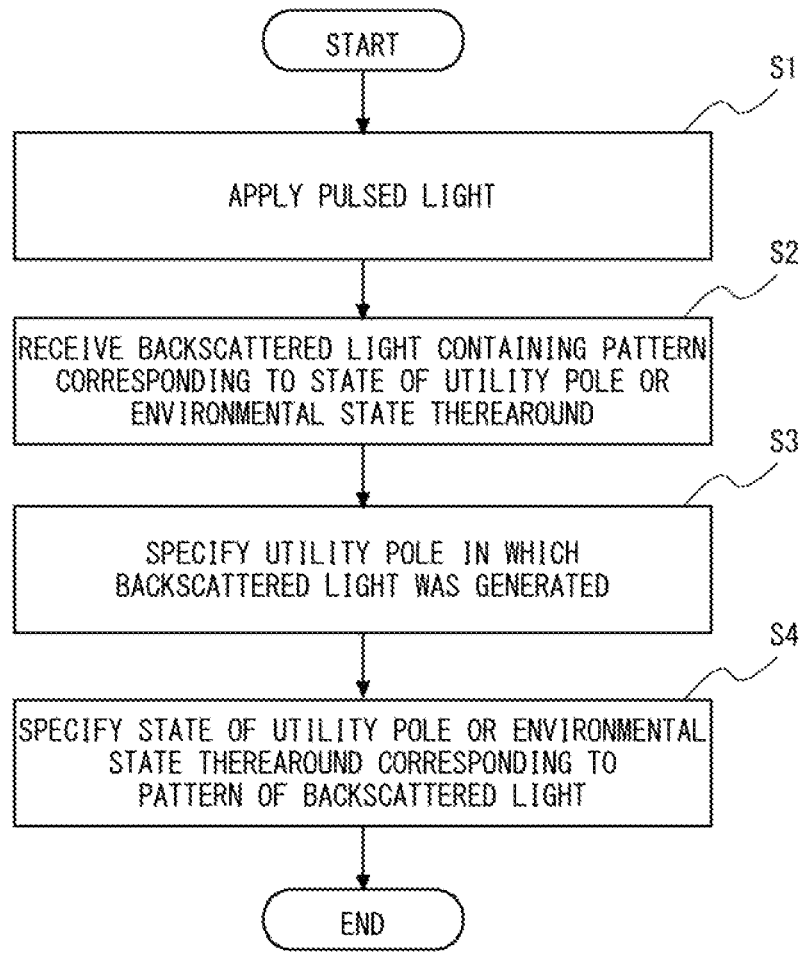
FIG. 7 is a flowchart showing an example of a flow of operations performed by a state specifying system according to an example embodiment.

As shown in FIG. 7, firstly, the fiber sensing unit 331 makes pulsed light enter at least one communication optical fiber contained in the optical fiber cable 20 (step S1). Next, the fiber sensing unit 331 receives backscattered light containing a pattern that changes according to the state of the utility pole 10 or the environmental state around the utility pole 10 from the same communication optical fiber to which the pulsed light has entered (step S2).

Next, the fiber sensing unit 331 identifies the utility pole 10 in which the backscattered light received in the step S2 was generated (step S3). Note that the fiber sensing unit 331 may identify the utility pole 10 in which the backscattered light was generated by using the above-described method based on the time difference.

After that, the specifying unit 332 specifies the state of the utility pole 10 or the environmental state around the utility pole 10, which corresponds to the pattern of the backscattered light received in the step S2 and has been specified in the step S3 (step S4).

Note that the specifying unit 332 specifies the state of the utility pole 10 or the environmental state around the utility pole 10 corresponding to the pattern of the backscattered light received by the fiber sensing unit 331 by using a correspondence table in which patterns of backscattered light are associated with states of the utility pole 10 or environment states therearound.

For example, in the case in which the specifying unit 332 holds the correspondence table shown in FIG. 5 and specifies the deterioration state of the utility pole 10 as the state of the utility pole 10, when the pattern of the backscattered light received by the fiber sensing unit 331 is classified as the pattern X, the specifying unit 332 determines that the utility pole 10 is normal.

Note that, in FIG. 7, every time backscattered light having a pattern that changes according to the state of the utility pole 10 or the environment state therearound is received in the step S2, the processes in the steps S3 and S4 may be performed. Alternatively, after a plurality of backscattered lights each having a pattern that changes according to the state of the utility pole 10 or the environmental state therearound are received in the step S2, the processes in the steps S3 and S4 may be performed for each of the backscattered lights.

Advantageous Effect of Example Embodiment

As described above, according to this example embodiment, backscattered light (optical signals) is received from at least one communication optical fiber contained in the optical fiber cable 20, and the state of the utility pole 10 or the environmental state around the utility pole 10 corresponding to the pattern of the received backscattered light is specified. Therefore, it is possible to accurately specify the state of the utility pole 10 or the environmental state around the utility pole 10.

Further, according to this example embodiment, it is sufficient to have an existing communication optical fiber in order to specify the state of the utility pole 10 or the environmental state around the utility pole 10. That is, unlike Patent Literature 1, there is no need to linearly or spirally dispose an optical fiber in the vertical direction of a utility pole, and unlike Patent Literature 2, there is no need to dispose a nesting detection core line in a utility pole. Therefore, since the state specifying system requires no dedicated structure in order to specify the state of the utility pole 10 or the environmental state around the utility pole 10, it can be constructed at a low cost.

Further, according to this example embodiment, it is possible to simultaneously and remotely specify the state of each of a plurality of utility poles 10 or the environmental state around each of them by using an existing communication optical fiber. Therefore, it becomes easy to recognize the state of the utility pole 10 or the environmental state therearound, and it is possible to reduce the cost required to recognize the state or the environmental state.

Further, according to this example embodiment, an optical fiber sensing technique in which an optical fiber is used as a sensor is used. Therefore, for example, there are following advantages: the system is not affected by electromagnetic noises; there is no need to supply power to the sensor; the system has an excellent environmental resistance; and the maintenance thereof is easy.

Other Example Embodiment

Note that the specifying unit 332 may hold, for each utility pole 10, information about the state of the utility pole 10 or the environmental state therearound, and specify the state of the utility pole 10 or the environmental state therearound at regular intervals (e.g., every year), so that the specifying unit 332 may specify changes in the state of the utility pole 10 or the environmental state therearound over time.

Further, when the specifying unit 332 specifies changes in the deterioration state of the utility pole 10 over time, it may detect a sign of the deterioration of the utility pole 10 or the breakage thereof based on the changes in the deterioration state of the utility pole 10 over time. For example, it is conceivable that when the deterioration level of a utility pole 10 that was normal two years ago became a deterioration level 1 one year ago and became a deterioration level 2 now, the specifying unit 332 will detect that the deterioration level of the utility pole 10 is a deterioration level 3 one year later.

Figure 8:
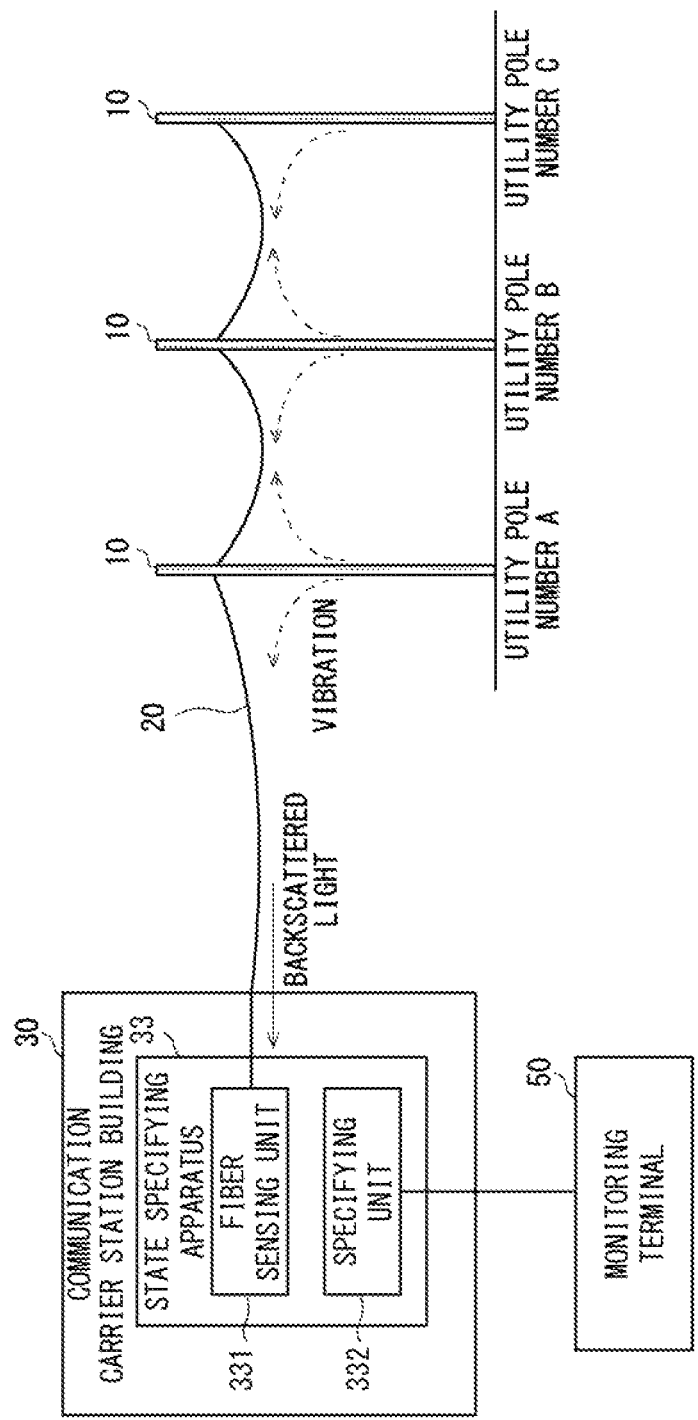
FIG. 8 shows an example of a state specifying system according to another example embodiment.

Further, as shown in FIG. 8, a monitoring terminal 50 that monitors the utility poles 10 based on the result of the specifying process performed by the state specifying apparatus 33 may be provided. The monitoring terminal 50 may shows a system administrator or the like a state of the utility pole 10, an environmental state around the utility pole 10, changes in these states over time, a sign of the deterioration or the breakage of the utility pole 10, and the like as a result of the specifying process performed by the state specifying apparatus 33. Further, the monitoring terminal 50 may calculate a replacement time of the utility pole 10 or a restoration time thereof based on the result of the specifying process performed by the state specifying apparatus 33, and show the system administrator or the like the replacement time or the restoration time of the utility pole 10. Further, although the monitoring terminal 50 is provided outside the communication carrier station building 30 in the drawing, it may be provided inside the communication carrier station building 30. Further, when the monitoring terminal 50 is provided outside the communication carrier station building 30, utility poles 10 that are connected to a plurality of respective communication carrier station buildings 30 by optical fiber cables 20 may be monitored by one monitoring terminal 50 in a centralized manner.

Further, the fiber sensing unit 331 and the specifying unit 332 of the state specifying apparatus 33 are disposed remotely from each other. For example, only the fiber sensing unit 331 may be provided inside the communication carrier station building 30, and the state specifying apparatus 33 including the specifying unit 332 may be provided outside the communication carrier station building 30.

Further, in the above-described example embodiment, only one fiber sensing unit 331 is provided and it exclusively use the optical fiber cable 20. However, the present disclosure is not limited to this example. The disposition of a fiber sensing unit 331 in a state specifying system according to other example embodiments will be described with reference to FIGS. 9 to 12. Note that, in FIGS. 9 to 12, the illustration of the specifying unit 332 is omitted.

Figure 9:
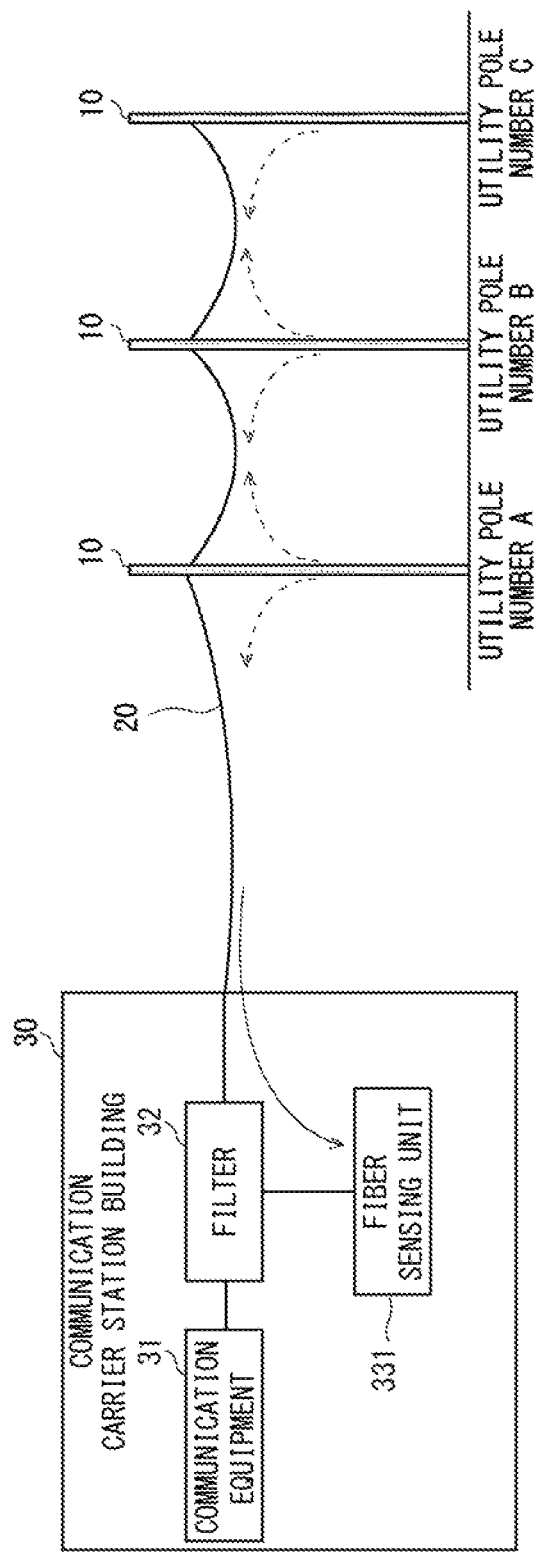
FIG. 9 shows an example of a disposition of a fiber sensing unit in a state specifying system according to another example embodiment.

In an example shown in FIG. 9, the fiber sensing unit 331 shares the optical fiber cable 20 with existing communication equipment 31. Further, in order to enable the fiber sensing unit 331 and the existing communication equipment 31 to share the optical fiber cable 20, a filter 32 for separating signals is provided.

Figure 10:
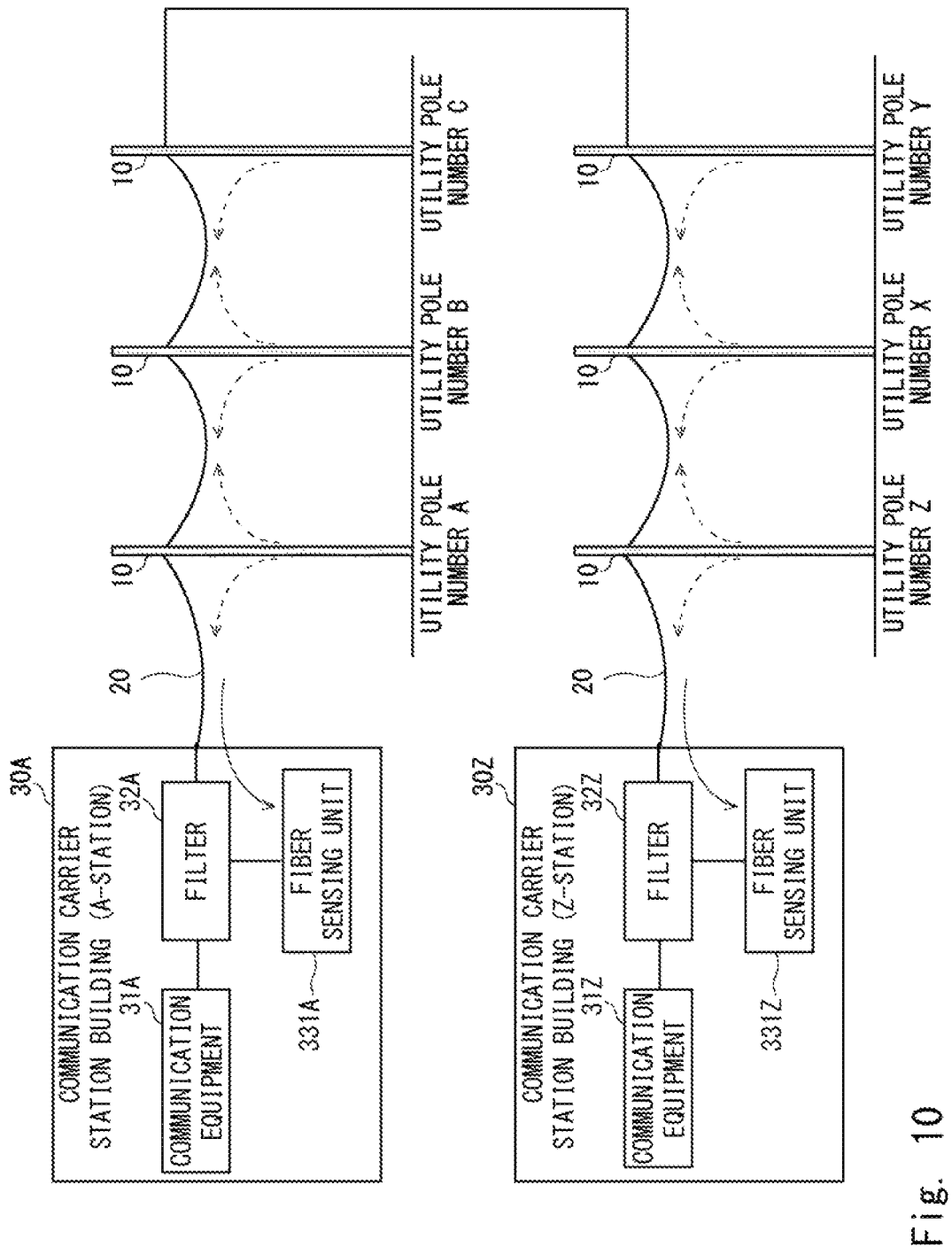
FIG. 10 shows another example of a disposition of a fiber sensing unit in a state specifying system according to another example embodiment.

In an example shown in FIG. 10, one fiber sensing unit 331 is provided in each of a plurality of communication carrier station buildings 30 (one fiber sensing unit 331 is provided in each of two communication carrier station buildings 30A and 30Z in FIG. 10). Specifically, fiber sensing units 331A and 331Z are provided in the communication carrier station buildings 30A and 30Z, respectively.

Note that, in the example shown in FIG. 10, utility poles 10 having utility pole numbers A, B and C are connected to the communication carrier station building 30A by an optical fiber cable 20, and utility poles 10 having utility pole numbers X, Y and Z are connected to the communication carrier station building 30Z by another optical fiber cable 20. Further, the utility poles 10 having the utility pole numbers C and Y are connected to each other by another optical fiber cable 20. The communication equipment 31A and 31Z correspond to the communication equipment 31, and the filters 32A and 32Z correspond to the filter 32.

In the example shown in FIG. 10, both the fiber sensing units 331A and 331Z monitor the utility poles 10 having the utility pole numbers A, B, C, X, Y and Z.

Figure 11:
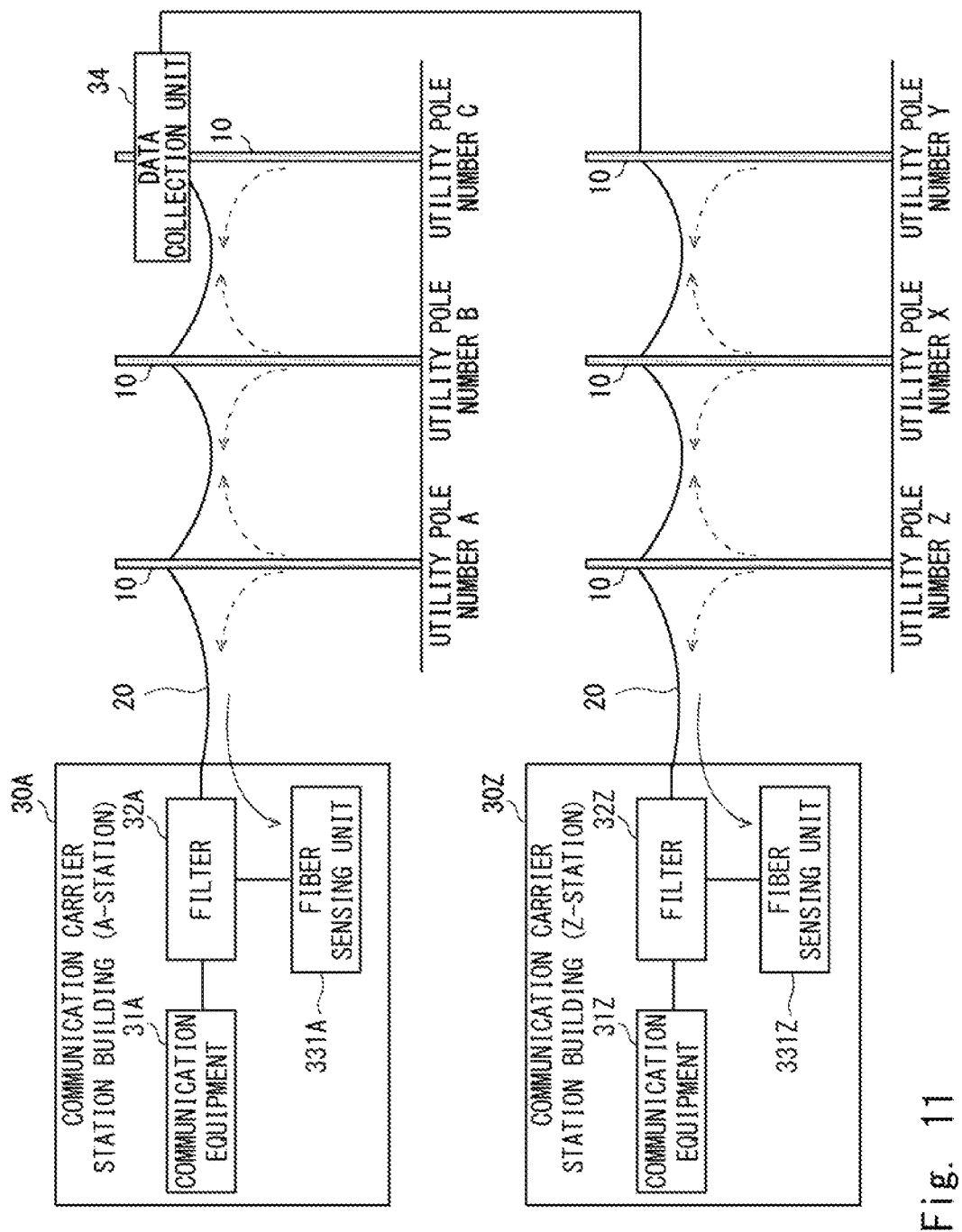
FIG. 11 shows yet another example of a disposition of a fiber sensing unit in a state specifying system according to another example embodiment.

In an example shown in FIG. 11, a data collection unit 34 is provided in a utility pole 10 having a utility pole number C as compared to the example shown in FIG. 10. Note that since the number of utility poles 10 is six, only one data collection unit 34 is provided. However, one data collection unit 34 may be provided for a predetermined number of utility poles 10 (e.g., for ten utility poles 10). That is, at least one data collection unit 34 may be provided. For example, in the case where the optical fiber cable 20 is strung (e.g., stretched) through 100 utility poles 10, one data collection unit 34 may be provided for every ten utility poles 10. That is, ten data collection units 34 may be provided in total.

In the example shown in FIG. 11, each of the data collection units 34 collects data about patterns (sounds, temperatures, vibrations, etc.) of a predetermined number of corresponding utility poles 10, and the specifying unit 332 summarizes the data collected by all the data collection units 34. Note that the data may be transmitted from each of the data collection units 34 to the specifying unit 332 through the optical fiber cable 20, or may be transmitted through a separately provided radio apparatus. The specifying unit 332 specifies, for utility poles 10 of which the data collection unit(s) 34 has collected data, the states of the utility poles 10 or the environmental states around the utility poles 10 based on their data.

Therefore, the section that is monitored by one fiber sensing unit 331 is shortened, and the number of utility poles 10 that are monitored by one fiber sensing unit 331 is reduced. Since the section monitored by the fiber sensing unit 331 is shortened, the distance of the transmission of the pulsed light and the backscattered light is also shortened, so that the loss caused by the fiber is reduced. As a result, the S/N ratio (the signal-to-noise ratio) of the received backscattered light is improved, so that the monitoring accuracy can be improved. Further, since the number of utility poles 10 monitored by the fiber sensing unit 331 is reduced, the monitoring cycle can be improved.

Figure 12:
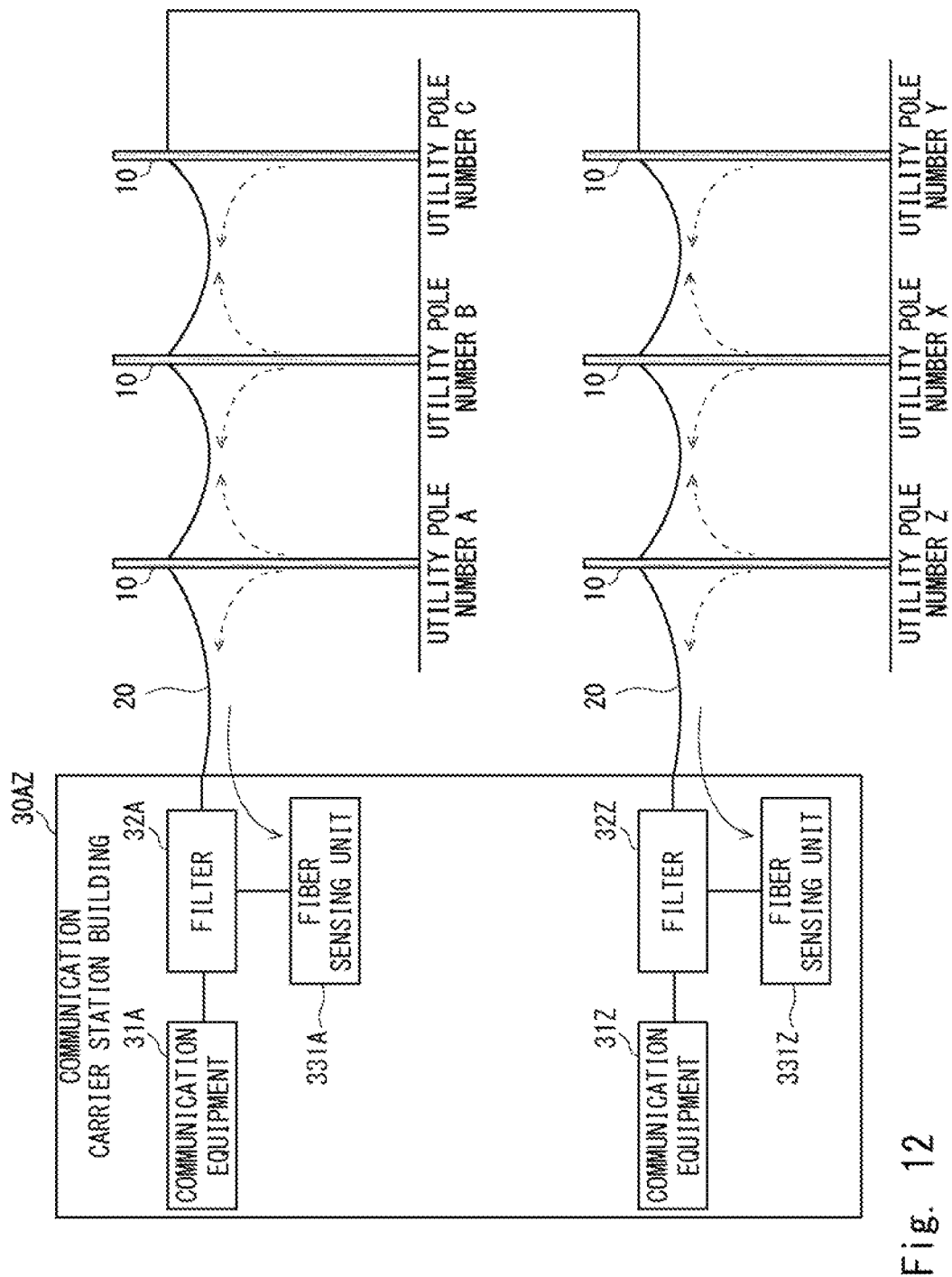
FIG. 12 shows yet another example of a disposition of a fiber sensing unit in a state specifying system according to another example embodiment.

In an example shown in FIG. 12, a plurality of fiber sensing units 331 (two fiber sensing units 331A and 331Z in FIG. 12) are provided in one communication carrier station building 30AZ. Note that, in the example shown in FIG. 12, utility poles 10 having utility pole numbers A, B and C are connected to the fiber sensing unit 331A by an optical fiber cable 20, and utility poles 10 having utility pole numbers X, Y and Z are connected to the fiber sensing unit 331Z by another optical fiber cable 20. Further, the utility poles 10 having the utility pole numbers C and Y are connected to each other by another optical fiber cable 20. The communication equipment 31A and 31Z correspond to the communication equipment 31, and the filters 32A and 32Z correspond to the filter 32.

In the example shown in FIG. 12, both the fiber sensing units 331A and 331Z monitor the utility poles 10 having the utility pole numbers A, B, C, X, Y and Z. However, the fiber sensing unit 331A monitors the utility poles 10 by making pulsed light enter the optical fiber in a clockwise direction, and the fiber sensing unit 331Z monitors the utility poles 10 by making pulsed light enter the optical fiber in a counter-clockwise direction.

Note that in the case where a plurality of fiber sensing units 331 are provided as shown in FIGS. 10 to 12, one state specifying apparatus 33 including a specifying unit 332 may be provided for the plurality of fiber sensing units 331. Further, the states of utility poles 10 that are connected to a plurality of respective fiber sensing units 331 by optical fiber cables 20, or the environmental states of these utility poles 10 may be specified by one state specifying apparatus 33 in a centralized manner. In this case, the state specifying apparatus 33 may be provided in the inside of one of the communication carrier station buildings 30, or may be provided outside the communication carrier station buildings 30.

Further, there is a possibility that the optical fiber cable 20 strung (e.g., stretched) through the utility poles 10 is broken. Therefore, operations that are performed by the fiber sensing unit 331 when the optical fiber cable 20 is broken in a state specifying system according to other example embodiments will be described with reference to FIGS. 13 to 15. Note that, in FIGS. 13 to 15, the illustration of the specifying unit 332 is omitted.

Figure 13:
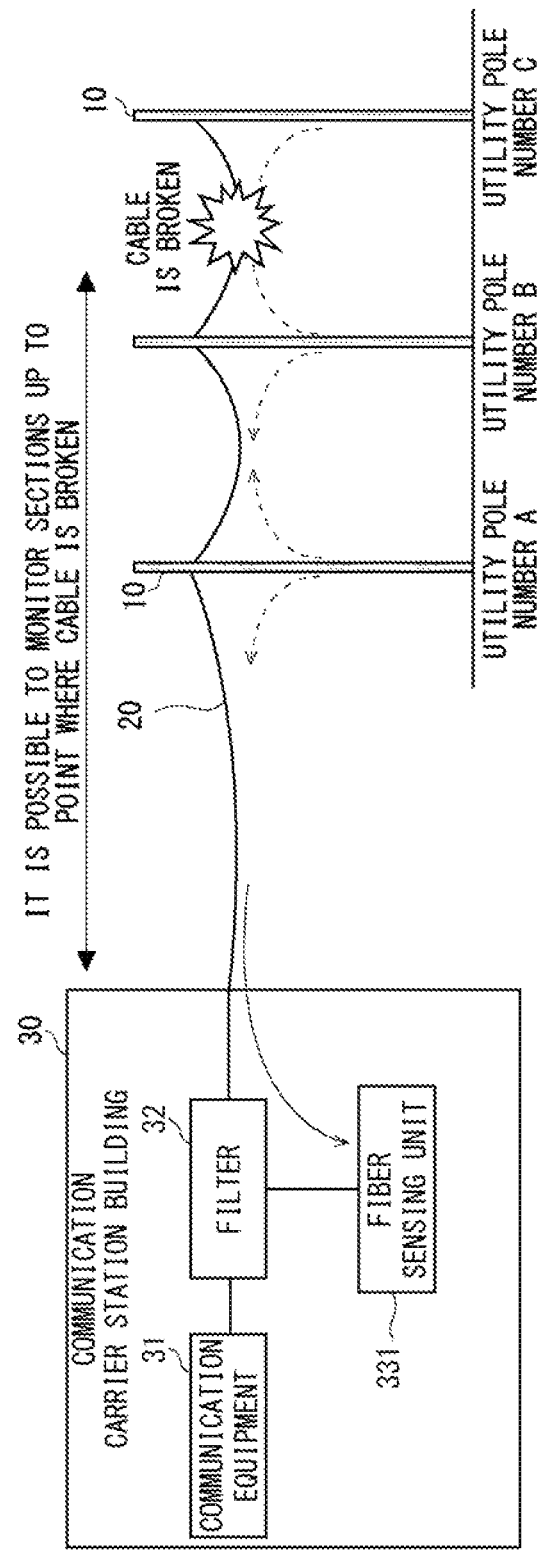
FIG. 13 shows an example of an operation that is performed by the fiber sensing unit when an optical fiber cable is broken in the state specifying system shown in FIG. 9.

An example shown in FIG. 13 is an example in which a part of the optical fiber cable 20 located between the utility poles 10 having the utility pole numbers B and C is broken in the configuration shown in FIG. 9. The fiber sensing unit 331 continues making the pulsed light enter the optical fiber cable 20 even when the optical fiber cable 20 is broken. In this way, the communication carrier station building 30 can continuously monitor the sections up to the place where the optical fiber cable is broken.

Figure 14:
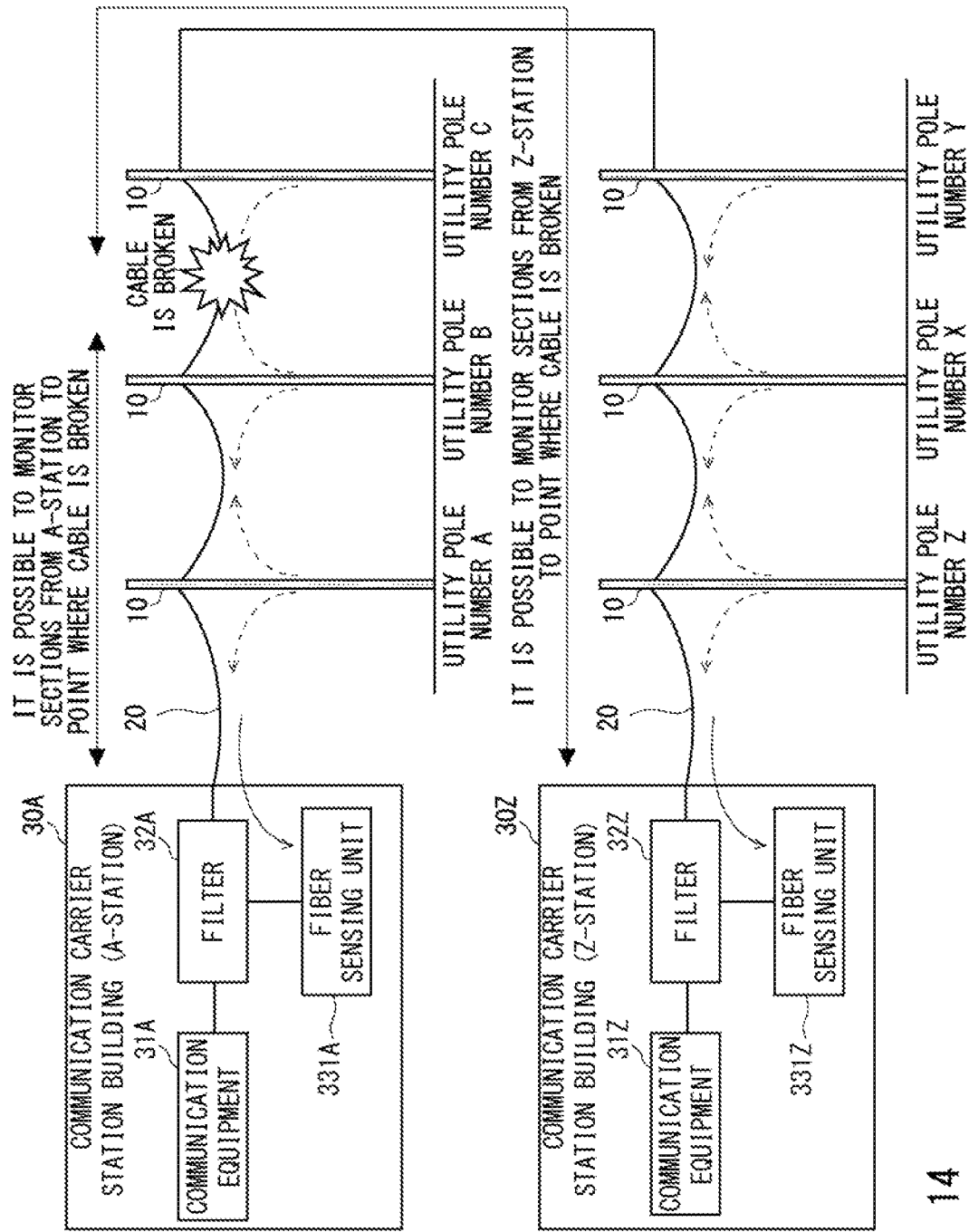
FIG. 14 shows an example of an operation that is performed by the fiber sensing unit when an optical fiber cable is broken in the state specifying system shown in FIG. 10.

An example shown in FIG. 14 is an example in which a part of the optical fiber cable 20 located between the utility poles 10 having the utility pole numbers B and C is broken in the configuration shown in FIG. 10. The fiber sensing units 331A and 331Z continues making the pulsed light enter the optical fiber cable 20 even when the optical fiber cable 20 is broken. Note that each of the utility poles 10 is connected to at least two communication carrier station buildings 30 (two communication carrier station buildings 30A and 30Z in FIG. 14) without exception. Therefore, by having the communication carrier station buildings 30A and 30Z monitor the utility poles in both the directions, it is possible to form a redundant configuration by which all the sections can be continuously monitored in the case of a single failure.

Figure 15:
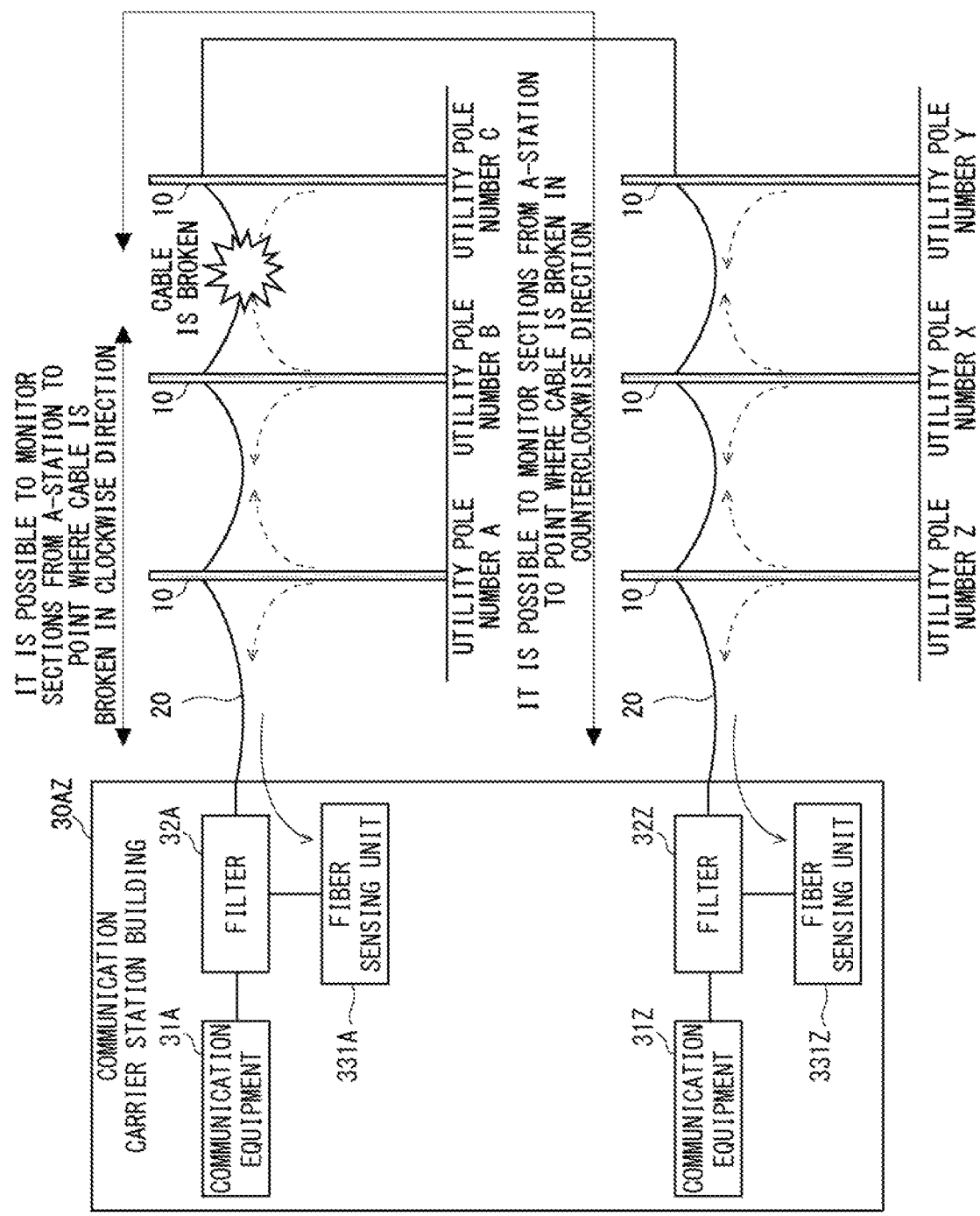
FIG. 15 shows an example of an operation that is performed by the fiber sensing unit when an optical fiber cable is broken in the state specifying system shown in FIG. 12.

An example shown in FIG. 15 is an example in which a part of the optical fiber cable 20 located between the utility poles 10 having the utility pole numbers B and C is broken in the configuration shown in FIG. 12. The fiber sensing units 331A and 331Z continues making the pulsed light enter the optical fiber cable 20 even when the optical fiber cable 20 is broken. Note that, in the example shown in FIG. 15, a ring configuration in which the optical fiber cables 20 are connected in a ring shape is formed. Therefore, by having the one communication carrier station building 30AZ monitor the utility poles in both the directions of the ring, it is possible to form a redundant configuration by which all the sections can be continuously monitored in the case of a single failure.

Although the present disclosure is explained above with reference to embodiments, the present disclosure is not limited to the above-described embodiments. Various modifications that can be understood by those skilled in the art can be made to the configuration and details of the present disclosure within the scope of the invention.

Further, the whole or part of the embodiments disclosed above can be described as, but not limited to, the following supplementary notes.

(Supplementary Note 1)

A state specifying system comprising:

a cable disposed in a utility pole, the cable containing a communication optical fiber;

a receiving unit configured to receive an optical signal from at least one communication optical fiber contained in the cable; and a specifying unit configured to specify a state of the utility pole or an environmental state around the utility pole corresponding to a pattern of the optical signal received by the receiving unit.

(Supplementary Note 2)

The state specifying system described in Supplementary note 1, wherein the specifying unit holds a correspondence table in which patterns of the optical signal are associated with states of the utility pole or environmental states therearound, and the specifying unit specifies the state of the utility pole or the environmental state therearound corresponding to the pattern of the optical signal received by the receiving unit by using the correspondence table.

(Supplementary Note 3)

The state specifying system described in Supplementary note 1 or 2, wherein the specifying unit specifies a change in the state of the utility pole or the environmental state therearound over time by specifying the state of the utility pole or the environmental state therearound at regular intervals.

(Supplementary Note 4)

The state specifying system described in Supplementary note 3, wherein the specifying unit specifies a change in a deterioration state of the utility pole over time, and the specifying unit detects a sign of deterioration of the utility pole or breakage thereof based on the change in the deterioration state of the utility pole over time.

(Supplementary Note 5)

The state specifying system described in any one of Supplementary notes 1 to 4, wherein the cable is disposed substantially perpendicular to a longitudinal direction of the utility pole.

(Supplementary Note 6)

A state specifying apparatus comprising:

a receiving unit configured to receive an optical signal from at least one communication optical fiber contained in a cable disposed in a utility pole; and a specifying unit configured to specify a state of the utility pole or an environmental state around the utility pole corresponding to a pattern of the optical signal received by the receiving unit.

(Supplementary Note 7)

The state specifying apparatus described in Supplementary note 6, wherein the specifying unit holds a correspondence table in which patterns of the optical signal are associated with states of the utility pole or environmental states therearound, and the specifying unit specifies the state of the utility pole or the environmental state therearound corresponding to the pattern of the optical signal received by the receiving unit by using the correspondence table.

(Supplementary Note 8)

The state specifying apparatus described in Supplementary note 6 or 7, wherein the specifying unit specifies a change in the state of the utility pole or the environmental state therearound over time by specifying the state of the utility pole or the environmental state therearound at regular intervals.

(Supplementary Note 9)

The state specifying apparatus described in Supplementary note 8, wherein the specifying unit specifies a change in a deterioration state of the utility pole over time, and the specifying unit detects a sign of deterioration of the utility pole or breakage thereof based on the change in the deterioration state of the utility pole over time.

(Supplementary Note 10)

The state specifying apparatus described in any one of Supplementary notes 6 to 9, wherein the cable is disposed substantially perpendicular to a longitudinal direction of the utility pole.

(Supplementary Note 11)

A state specifying method performed by a state specifying apparatus, comprising:

receiving an optical signal from at least one communication optical fiber contained in a cable disposed in a utility pole; and specifying a state of the utility pole or an environmental state around the utility pole corresponding to a pattern of the received optical signal.

(Supplementary Note 12)

A non-transitory computer readable medium storing a program for causing a computer to perform:

a process of receiving an optical signal from at least one communication optical fiber contained in a cable disposed in a utility pole; and a process of specifying a state of the utility pole or an environmental state around the utility pole corresponding to a pattern of the received optical signal.

This application is based upon and claims the benefit of priority from Japanese patent applications No. 2018-162041, filed on Aug. 30, 2018, the disclosure of which is incorporated herein in its entirety by reference.

REFERENCE SIGNS LIST

10 UTILITY POLE
20 OPTICAL FIBER CABLE
30, 30A, 30Z, 30AZ COMMUNICATION CARRIER STATION BUILDING
31, 31A, 31Z COMMUNICATION EQUIPMENT
32, 32A, 32Z FILTER
33 STATE SPECIFYING APPARATUS
331, 331A, 331Z FIBER SENSING UNIT
332 SPECIFYING UNIT
34 DATA COLLECTION UNIT
40 COMPUTER
401 PROCESSOR
402 MEMORY
403 STORAGE
404 INPUT/OUTPUT INTERFACE
4041 DISPLAY APPARATUS
4042 INPUT APPARATUS
405 COMMUNICATION INTERFACE
50 MONITORING TERMINAL

What is claimed is:

1. A state specifying system comprising:
a cable disposed in a utility pole, the cable containing a communication optical fiber;
a receiving unit configured to receive an optical signal from at least one communication optical fiber contained in the cable; and
a specifying unit configured to specify a state of the utility pole or an environmental state around the utility pole corresponding to a pattern of the optical signal received by the receiving unit,
wherein
the specifying unit holds a correspondence table in which patterns of the optical signal are associated with states of the utility pole or environmental states therearound, and
the specifying unit specifies the state of the utility pole or the environmental state therearound corresponding to the pattern of the optical signal received by the receiving unit by using the correspondence table.

2. The state specifying system according to claim 1, wherein the specifying unit specifies a change in the state of the utility pole or the environmental state therearound over time by specifying the state of the utility pole or the environmental state therearound at regular intervals.

3. The state specifying system according to claim 2, wherein
the specifying unit specifies a change in a deterioration state of the utility pole over time, and
the specifying unit detects a sign of deterioration of the utility pole or breakage thereof based on the change in the deterioration state of the utility pole over time.

4. The state specifying system according to claim 1, wherein the cable is disposed substantially perpendicular to a longitudinal direction of the utility pole.

5. A state specifying apparatus comprising:
a receiving unit configured to receive an optical signal from at least one communication optical fiber contained in a cable disposed in a utility pole; and
a specifying unit configured to specify a state of the utility pole or an environmental state around the utility pole corresponding to a pattern of the optical signal received by the receiving unit,
wherein
the specifying unit holds a correspondence table in which patterns of the optical signal are associated with states of the utility pole or environmental states therearound, and
the specifying unit specifies the state of the utility pole or the environmental state therearound corresponding to the pattern of the optical signal received by the receiving unit by using the correspondence table.

6. The state specifying apparatus according to claim 5, wherein the specifying unit specifies a change in the state of the utility pole or the environmental state therearound over time by specifying the state of the utility pole or the environmental state therearound at regular intervals.

7. The state specifying apparatus according to claim 6, wherein
the specifying unit specifies a change in a deterioration state of the utility pole over time, and
the specifying unit detects a sign of deterioration of the utility pole or breakage thereof based on the change in the deterioration state of the utility pole over time.

8. The state specifying apparatus according to claim 5, wherein the cable is disposed substantially perpendicular to a longitudinal direction of the utility pole.

9. A state specifying method performed by a state specifying apparatus, comprising:
receiving an optical signal from at least one communication optical fiber contained in a cable disposed in a utility pole; and
specifying a state of the utility pole or an environmental state around the utility pole corresponding to a pattern of the received optical signal;
holding a correspondence table in which patterns of the optical signal are associated with states of the utility pole or environmental states therearound; and
specifying the state of the utility pole or the environmental state therearound corresponding to the pattern of the optical signal by using the correspondence table.

* * * * *